United States Patent
Ohkawara (10) Patent No.: US 6,937,285 B2
(45) Date of Patent: Aug. 30, 2005

(54) IMAGE PICKUP APPARATUS AND POWER SUPPLY CONTROL METHOD THEREFOR

(75) Inventor: Hiroto Ohkawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/615,693

(22) Filed: Jul. 8, 2003

(65) Prior Publication Data

US 2004/0008422 A1 Jan. 15, 2004

(30) Foreign Application Priority Data

Jul. 9, 2002 (JP) ........................................ 2002-199835

(51) Int. Cl.$^7$ ........................ G03B 13/00; G03B 13/34; H04N 5/225
(52) U.S. Cl. ........................ 348/357; 348/351; 348/372; 396/129; 396/131; 396/137
(58) Field of Search ........................ 359/698; 396/129, 396/131, 137; 348/345, 349, 351, 357, 372

(56) References Cited

U.S. PATENT DOCUMENTS

| | | | |
|---|---|---|---|
| 4,864,344 A | | 9/1989 | Arakawa et al. ............ 396/135 |
| 4,984,000 A | * | 1/1991 | Watanabe et al. ............ 396/87 |
| 5,606,382 A | * | 2/1997 | Suh ............................ 396/101 |

FOREIGN PATENT DOCUMENTS

| | | |
|---|---|---|
| JP | 63-89824 | 4/1988 |
| JP | 7-093097 | 4/1995 |

OTHER PUBLICATIONS

Japanese Office Action dated Mar. 23, 2004 of basic Japanese Patent Appln No. 2002-199835, (no transn).

* cited by examiner

*Primary Examiner*—Georgia Epps
*Assistant Examiner*—Jack Dinh
(74) *Attorney, Agent, or Firm*—Morgan & Finnegan, LLP.

(57) ABSTRACT

In order to be able to reduce power consumption while making possible manual operation in any scene when the photographic situation demands its use, an image pickup apparatus has a ring member arranged concentrically with the optical axis of lenses, a detecting device for detecting the quantity of variation resulting from the rotation of the ring member, a control device for shifting/stopping a group of optical lenses in the direction of their optical axis on the basis of the result of detection by the detecting device, and a power supply control device for changing the state of power supply to the detecting device according to the mode of use. Power supply to the detecting device is prohibited when in the automatic focusing mode, and permitted in a focusing-locked state when in the photo shooting mode. It is also prohibited in the viewing mode.

7 Claims, 9 Drawing Sheets

PRIOR ART

PRIOR ART

F I G. 9A

PRIOR ART

F I G. 9B

IMAGE PICKUP APPARATUS AND POWER SUPPLY CONTROL METHOD THEREFOR

FIELD OF THE INVENTION

The present invention relates to an image pickup apparatus having an inner focusing type or some other lens system and a power supply control method therefor.

BACKGROUND OF THE INVENTION

In recent years, inner focusing type lenses have come to constitute the mainstream in integrated cameras for consumer use. To achieve more compactness and make possible shooting of an object just in front of the lens, an inner focusing type lens system has a configuration in which the moving locus of the correcting lens is stored in advance in a microcomputer as lens cam data, the correcting lens is driven according to the lens cam data and focusing is also accomplished with the correcting lens instead of mechanically linking the correcting lens and a variable-magnification lens with a cam, resulting in advantages of a lower price, a simplified system and a more compact and lighter lens tube.

Figure 6:
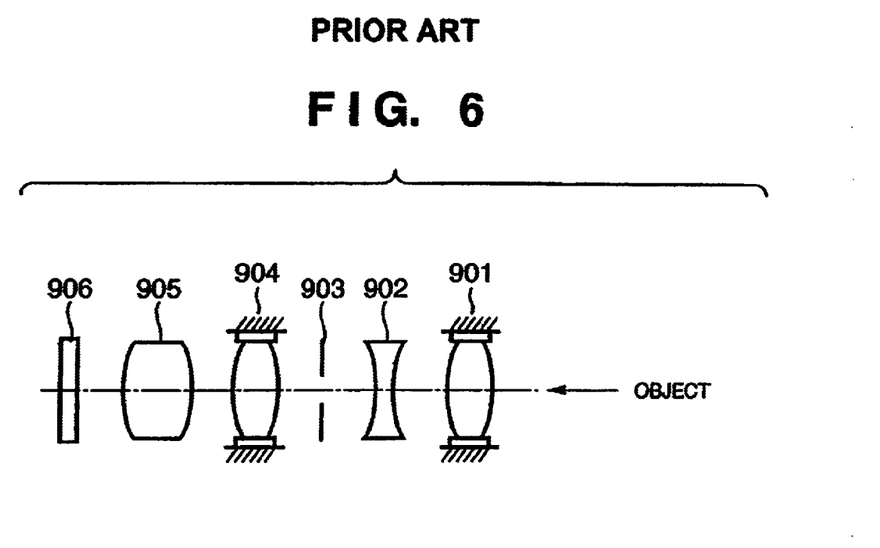
FIG. 6 schematically shows a configuration of an inner focusing type lens system according to the prior art.

FIG. 6 shows a configuration of an inner focusing type lens system according to the prior art.

In FIG. 6, reference numeral 901 denotes a fixed first lens group; 902, a magnifying second lens group (zoom lens); 903, a diaphragm; 904, a fixed third lens group; 905, a fourth lens group (focusing/compensating lens) combining the focusing function with the so-called compensating function, i.e. the function of compensating for a shift in the focal plane due to a variation in magnification; and 906, the image plane.

Figure 7:
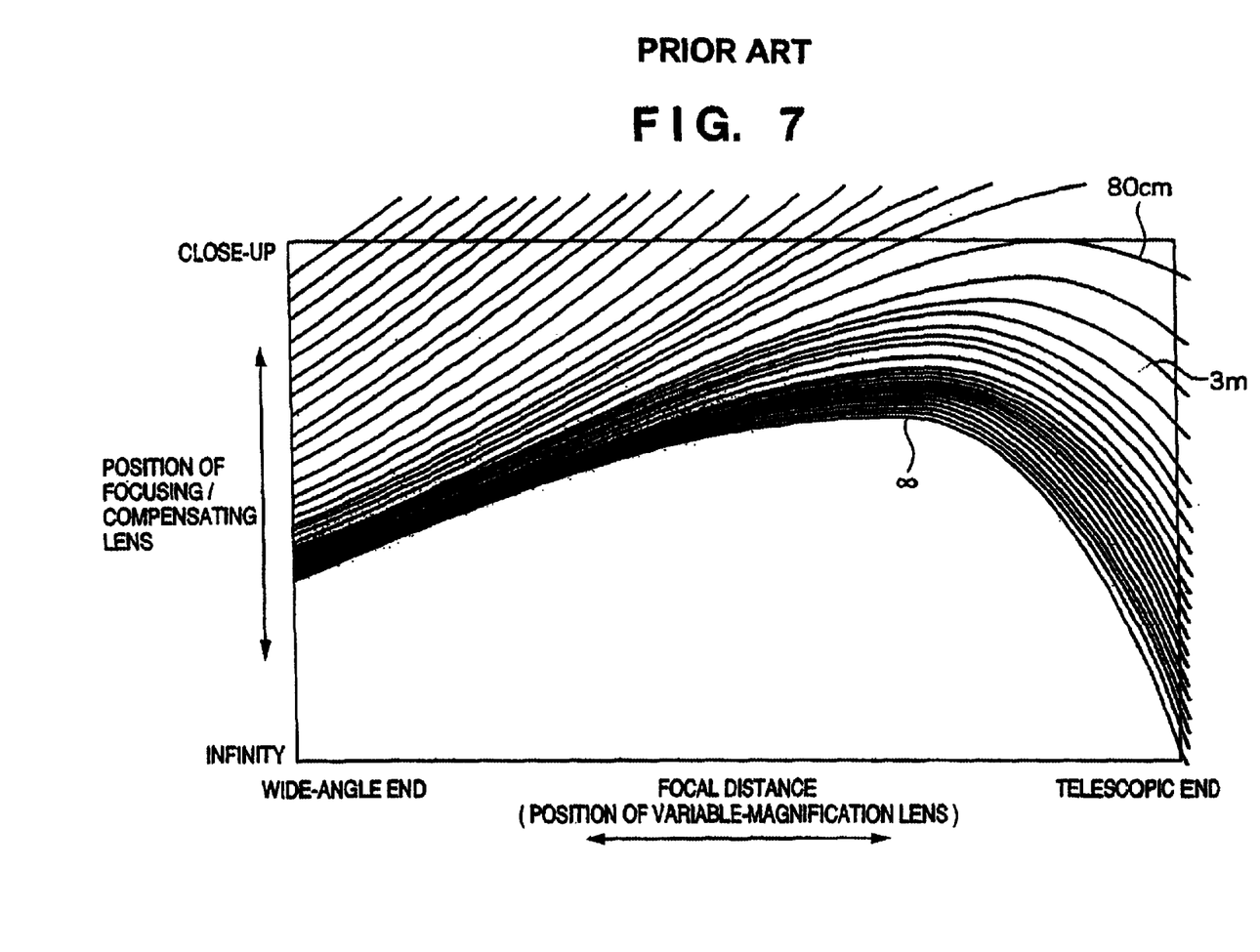
FIG. 7 is a graph showing the relationship between the position and the focal distance of a focusing/compensating lens.

As is known to the persons skilled in the art, since the focusing/compensating lens 905 combines the compensating function with the focusing function in a lens system illustrated in FIG. 6, the position of the focusing/compensating lens 905 for focusing on the image plane 906 varies with the distance to the object even if the focal distance is unchanged. In FIG. 7, the positions of the focusing/compensating lens 905 for focusing on the image plane 906 when the distance to the object is varied at each focal distance are continuously plotted. During a variation in magnification, the locus shown in FIG. 7 is selected according to the distance to the object, and clear zooming can be achieved by shifting the focusing/compensating lens 905 following the locus.

In such an inner focusing type lens system, when it is desired to manually drive the zoom lens 902 or the focusing/compensating lens 905, the usual practice is to provide a manipulating member which does not come into contact with the lens group, electrically detect the manipulated quantity of the manipulating member, and control a lens driving actuator or the like by a quantity corresponding to that manipulated quantity to shift the lens accordingly. In this connection, a system of shifting the zoom lens 902 or the focusing/compensating lens 905 by fitting an encoder to the lens tube and electrically detecting the direction and speed of the rotation of this encoder is proposed with a view to enabling the user to experience more of the feel of operating a front lens focusing type of a camera for professionals.

Figure 8A:
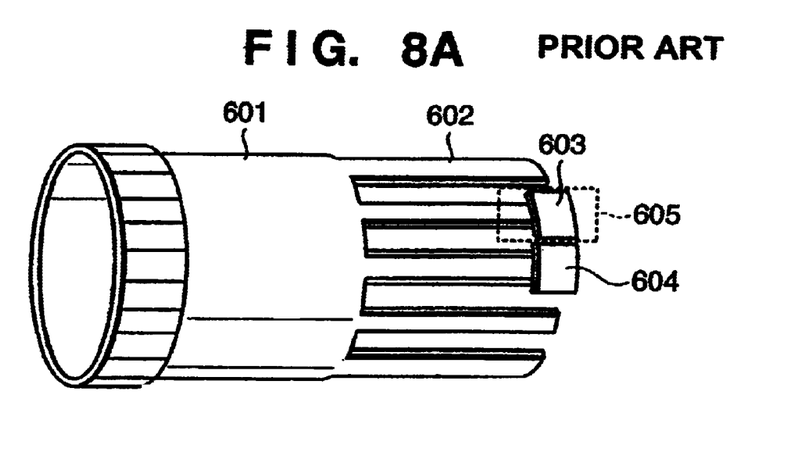
FIGS. 8A and 8B show the configuration of an encoder.

The configuration of the encoder will be described in detail below with reference to FIG. 8A and FIG. 8B wherein a zoom ring not mechanically connected to the zoom lens 902 and a focusing ring not mechanically connected to the focusing/compensating lens 905 are provided. FIG. 8A shows an external view of the encoder, and FIG. 8B, an enlarged view of a portion 605 surrounded by broken lines in FIG. 8A together with a ring rotation detecting circuit.

In FIG. 8A, reference numeral 601 denotes the focusing ring of a rotary type encoder to be snapped onto the lens tube; 602, the comb-shaped structure of the encoder having a light reflective portion and a light transmissive portion; and 603 and 604, ring rotation sensors each having a light projecting portion 606 and a light receiving portion 607, varying in the state of output signals depending on whether a reflected light from the comb-shaped structure 602 is received or not.

Figure 9A:
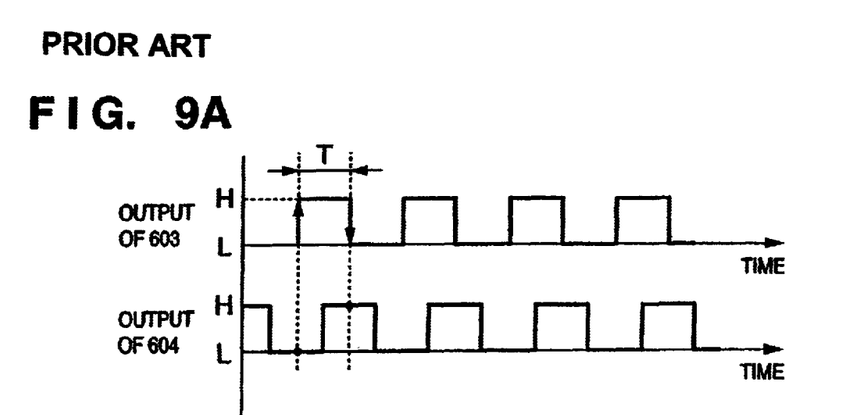
FIGS. 9A and 9B are waveform charts of output signals of ring rotation sensors.
Figure 9B:
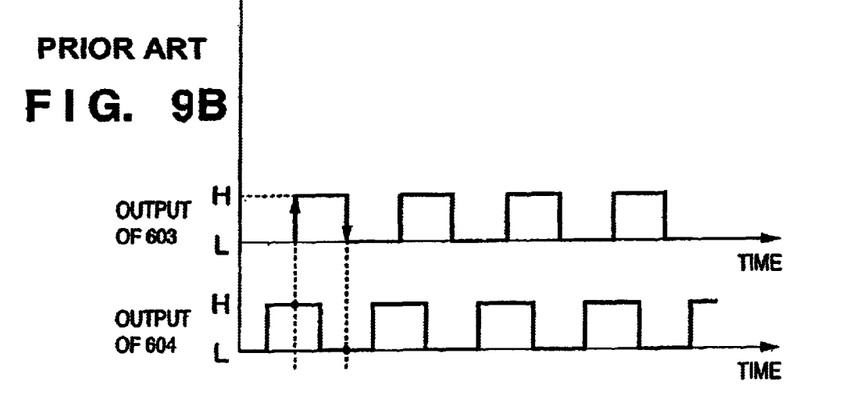

When the encoder of such a structure is rotated, the output signals of the ring rotation sensors 603 and 604 vary as shown in FIG. 9A or FIG. 9B. The positional relationship between the ring rotation sensors 603 and 604 is so determined that there be an appropriate lag between the phases of the two output signals; the rotating speed is detected according to the cycle of the variation of the output signals and the rotating direction, by the positional relationship between the two signals. Thus, if the output waveform shown in FIG. 9A is what is seen when the focusing ring 601 is operated in the forward rotating direction, that in FIG. 9B is what is seen when it is operated in the backward rotating direction. By taking in these output signals of the ring rotation sensors 603 and 604, the driving direction and speed of the lens are determined according to the state of those signals. Incidentally, T in FIG. 9A represents the length of time taken to shift the comb-shaped structure 602 by one tooth (a half cycle).

Figure 8B:
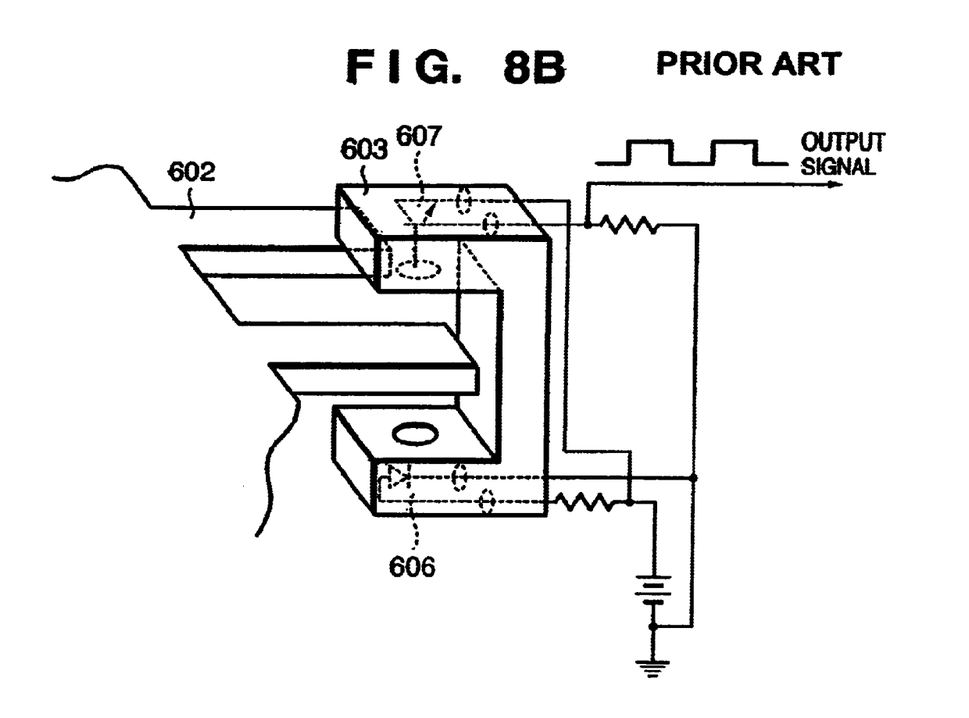

This image pickup apparatus, in spite of operating with an inner focusing type lens system, is enabled to perform power zooming and power focusing while retaining the feel of manipulation like a front lens focusing type by having the encoder shown in FIG. 8A and FIG. 8B and driving a lens actuator, such as a stepping motor according to the rotation of the focusing ring 601.

However, the above-described image pickup apparatus having an inner focusing type lens system according to the prior art, when the lenses are to be manually driven, a current in the order of tens of mA has to be let flow in order to secure a sufficient quantity of light emission because of the use of the ring rotation sensors 603 and 604 for the encoder. Nowadays, great importance is attached to the duration of battery charge and the requirement for power saving in the camera itself is increasingly stringent, the aforementioned amperage is too high to ignore, but the encoder shown in FIG. 8A and FIG. 8B embodies no particular consideration for power control, but consumes power wastefully.

Thus, while manual operation of lenses is an action only for shooting, if power is supplied to the camera unit during viewing, the encoder will also consume unnecessary power, which is undesirable, and the manual focusing function, which needs no manipulation when the auto-focusing (AF) function is at work, poses a particular problem to energy saving. Conversely, even in the AF mode, the user may have an intention to check the focusing when the focusing is locked after AF by half pressing of the photo key in still picture taking for instance, and it is preferable for the focusing ring 601 to remain effective.

Thus, the image pickup apparatus according to the prior art embodies no consideration for power saving while making possible manual operation in any scene when the photographic situation demands its use.

SUMMARY OF THE INVENTION

In view of the problem noted above, the present invention is intended to provide an image pickup apparatus and the like which permit a reduction in power consumption while making possible manual operation in any scene when the photographic situation demands its use.

In order to achieve the object stated above, an image pickup apparatus according to the invention comprises a detecting device adapted to detect the quantity of variation resulting from the rotation of a ring member, a lens shifting control device adapted to shift/stop image pickup lenses in the direction of their optical axis on the basis of the result of detection by the detecting device, and a power supply control device adapted to change the state of power supply to the detecting device according to the mode of use.

A power supply control method according to the invention is for an image pickup apparatus having a detecting device adapted to detect the quantity of variation resulting from the rotation of a ring member, and a lens shifting control device adapted to shift/stop image pickup lenses in the direction of their optical axis on the basis of the result of detection by the detecting device, and has a control step of changing the state of power supply to the detecting device according to the mode of use.

A recording medium according to the invention stores thereon a control program for controlling power supply to an image pickup apparatus having a detecting device adapted to detect the quantity of variation resulting from the rotation of a ring member, and a lens shifting control device adapted to shift/stop image pickup lenses in the direction of their optical axis on the basis of the result of detection by the detecting device, wherein the control program has codes of a control step of changing the state of power supply to the detecting device according to the mode of use.

Other objectios and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

A preferred embodiment of the present invention will be described below with reference to accompanying drawings.

<Overall Configuration of Image Pickup Apparatus>

Figure 1:
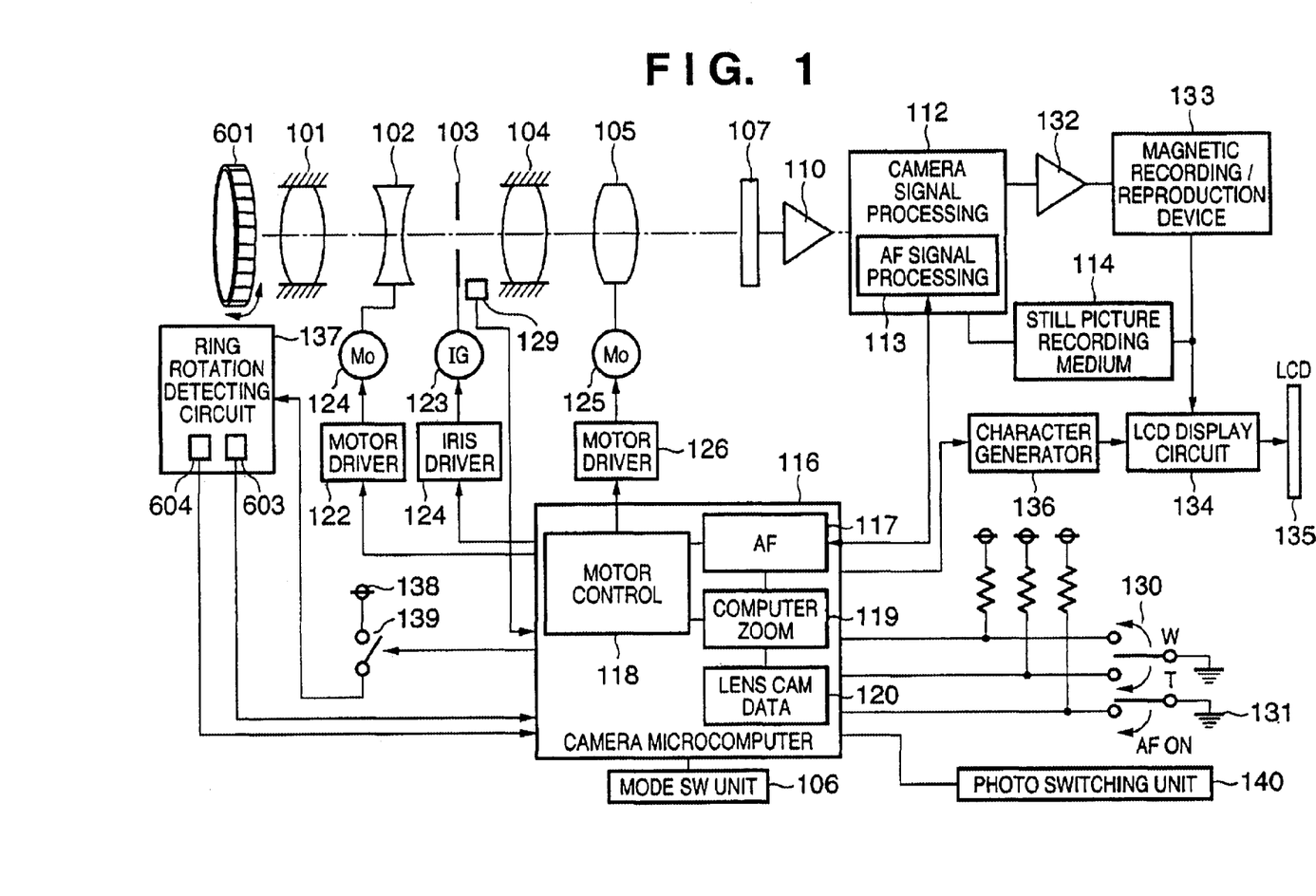
FIG. 1 is a block diagram showing the overall configuration of an image pickup device, which is a preferred embodiment of the invention.

FIG. 1 is a block diagram showing the overall configuration of an image pickup apparatus, which is a preferred embodiment of the invention.

A light from an object passes a fixed first lens group 101, a second lens group 102 performing variable magnification (hereinafter referred to as the zoom lens), a diaphragm 103, a fixed third lens group 104 and a fourth lens group 105 combining a focusing function and a compensating function to compensate for the shifting of the focal plane due to variable magnification (hereinafter referred to as the focusing./compensating lens), and forms an image on an image pickup element 107, such as a CCD.

In the drawing, reference numeral 601 denotes the focusing ring of the encoder shown in FIG. 8A; 603 and 604, ring rotation sensors; and 137, a ring rotation detecting circuit (FIG. 8B) for detecting the quantity of variation resulting from the rotation of the focusing ring 601.

An image formed on the image pickup element 107 by a light having passed the lenses 101 and 102, the diaphragm 103 and the lenses 104 and 105 undergoes photoelectric conversion, is amplified by an amplifier 110 to the optimal level, and entered into a camera signal processing circuit 112. After the signals are converted by the camera signal processing circuit 112 into input standard television signals, the converted signals are amplified by an amplifier 132 to the optimal level, and delivered to a magnetic recording/reproduction device 133 as well as to an LCD display circuit 134 to have the shot picture displayed on an LCD 135. Information items for the photographer, such as the shooting mode, shooting situation and alarms, are displayed on the LCD 135, and they are superposed over the shot picture by having a camera microcomputer 116 control a character generator 136 to cause output signals 136 to be mixed by the LCD display circuit 134.

On the other hand, it is possible to subject picture signals entered into the camera signal processing circuit 112 at the same time to JPEG conversion processing using an internal memory, and to record them onto a still picture recording medium 114, such as a card. The picture signals entered into the camera signal processing circuit 112 are also entered into an AF signal processing circuit 113 at the same time. An AF evaluation value generated by the AF signal processing circuit 113 is read by communication with the camera microcomputer 116.

The camera microcomputer 116 also reads in the on/off states of a zoom switch 130 and an AF switch 131, and detects the pressed-down state of a photo switch 140. The photo switch 140 has two pressed-down positions differing in the pressure on it and, when a focusing action is done by AF in a state in which the switch is half pressed, focusing is locked in a focused-in position. When focusing is locked, irrespective of whether in focus or out of focus, in a state of fully pressing down (deep pressing) the photo switch 140, the image is caught into a memory (not shown) in the camera signal processing circuit 112, and subjected to still picture recording onto a recording medium 133, the still picture recording medium 114 or the like.

Further, the camera microcomputer 116 judges whether moving pictures are or a still picture is to be shot according to the state of a mode switch 106, controls the magnetic recording/reproduction device 133 and the still picture recording medium 114 via the camera signal processing circuit 112, and supplies image signals suitable for the recording medium in use or, when the mode switch 106 is on for viewing, also controls reproduction by the magnetic recording/reproduction device 133 or the still picture recording medium 114.

When the AF switch 131 is off and the zoom switch 130 is pressed in the camera microcomputer 116, a computer zoom program 119 drives the variable-magnification lens 102 via a zoom motor 121 in the telescopic or wide-angle direction according to the direction in which the zoom switch 130 is pressed by sending a signal to a zoom motor driver 122 on the basis of lens cam data 120 stored within a lens microcomputer in advance. At the same time, a signal is sent to a focusing motor driver 126, and the magnification is varied by moving the focusing/compensating lens 105 via a focusing motor 125.

Since the in-focus state has to be maintained as long as the AF switch 131 is on and the zoom switch 130 is pressed, the computer zoom program 119 varies the magnification while keeping a position in which the AF evaluation value is maximized by referencing not only the lens cam data 120 stored in advance within the lens microcomputer but also an AF evaluation value signal sent to the camera microcomputer 116.

Or when the AF switch 131 is on and the zoom switch 130 is not pressed, an AF program 117 sends a signal to the focusing motor driver 126 so that the AF evaluation value signal sent from the camera microcomputer 116 be maximized, and performs automatic focus control by operating the focusing/compensating lens 105 via the focusing motor 125. Further, when the AF switch 131 is off and the zoom switch 130 is not pressed, the focusing/compensating lens 105 is controlled according to the result of detection by the focusing ring 601 to vary the in-focus point by manual focusing.

A feature of this embodiment of the invention consists in that power supply to the detecting circuit 137 for detecting the quantity of variation resulting from the rotation of the focusing ring 601 is so configured that it can be turned on and off, which is accomplished by control carried out by the camera microcomputer 116 over power flow from a power source 138 via a switch 139.

<Equivalent Circuit to Ring Rotation Detecting Circuit 137>

Figure 2A:
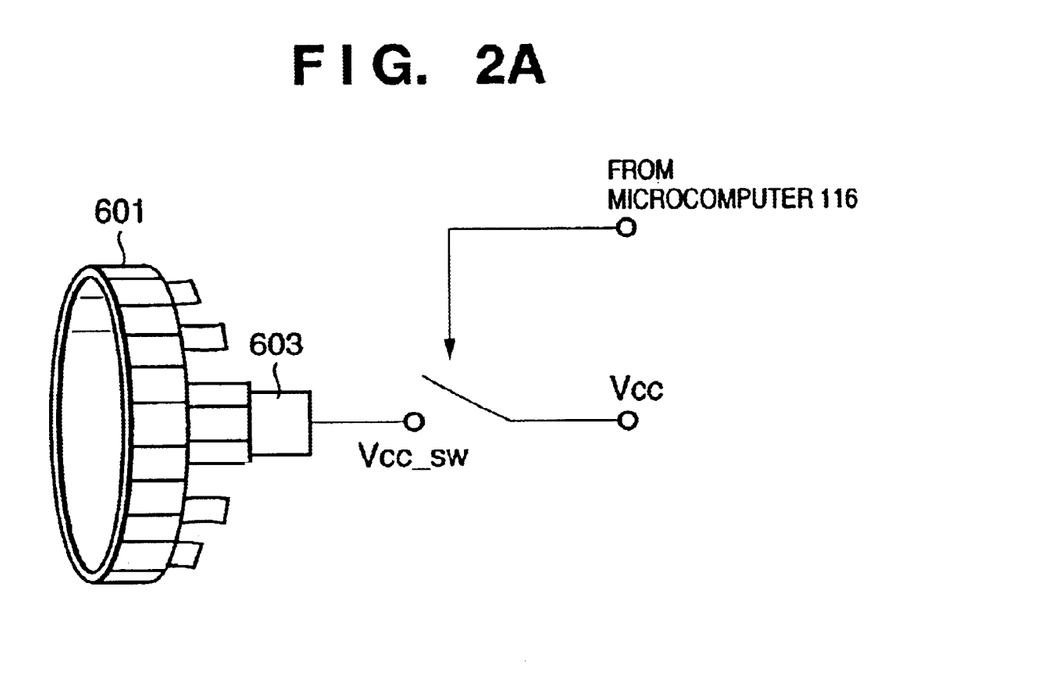
FIGS. 2A and 2B show an equivalent circuit to the ring rotation detecting circuit shown in FIG. 1.
Figure 2B:
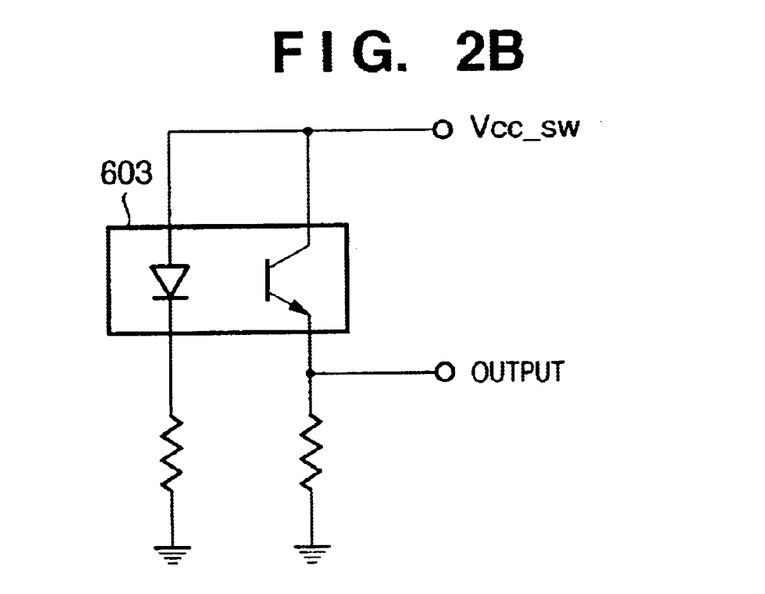

FIGS. 2A and 2B show an equivalent circuit to the ring rotation detecting circuit 137 shown in FIG. 1.

Whereas the switch 139 undergoes power supply control by the camera microcomputer 116 and a photodiode unit 606 emits light when power supply is on, with the emitted light being detected by a phototransistor unit 607, as the comb-like shape of the focusing ring 601 causes light projection and interception to be repeated along with the rotation of the ring, the output signal of a phototransistor unit 607 takes on a pulse output form (see FIGS. 9A and 9B).

The ring rotation sensors 603 and 604 are positioned to be 90 degrees apart in phase from each other, and two-phase pulse outputs are sent to the camera microcomputer 116. The camera microcomputer 116 determines the direction of rotation by detecting the phasic relationship of the two-phase pulses, and detects the quantity of rotation by counting the number of logical variations of the two-phase pulses. More specifically, by using an event counter function or a pulse accumulator function for two-phase pulses provided as usual microcomputer functions, up/down counts are generated according to the direction and quantity of rotation without hardware-wise read skipping.

<System of Generating Up/Down Counts>

Figure 3A:
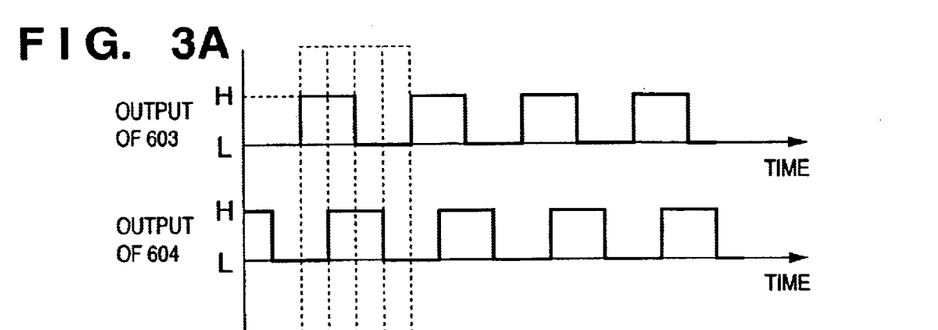
FIGS. 3A, 3B and 3C are diagrams for explaining a system of generating up/down counts.
Figure 3B:
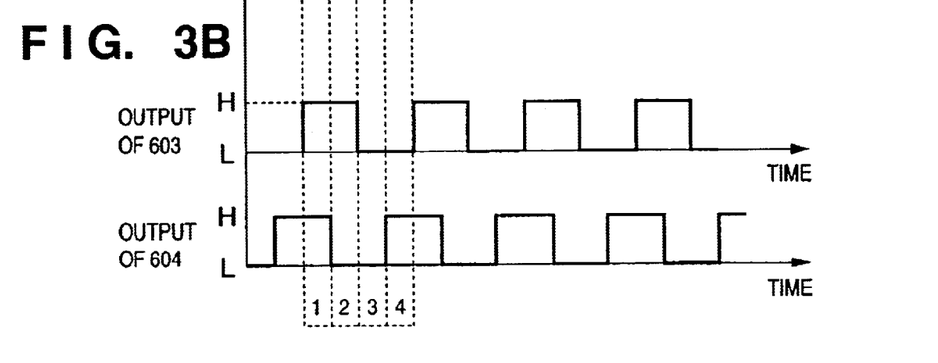
Figure 3C:
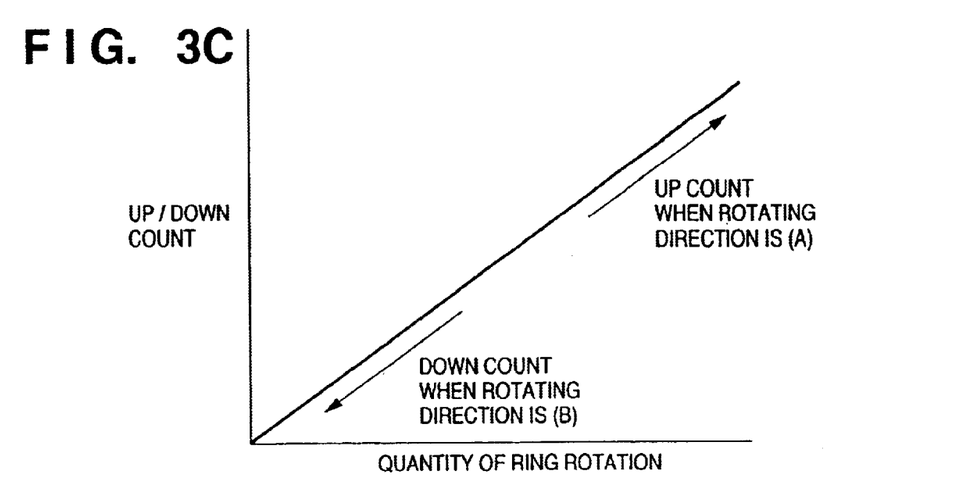

FIGS. 3A, 3B and 3C are diagrams for explaining a system of generating up/down counts by quad edge evaluation of usual two-phase pulses. FIGS. 3A and 3B show two-phase pulse output waveforms in different directions of ring rotation, forward and backward, and FIG. 3C shows a typical graph of the up/down counts so generated.

Now supposing that the phasic state varies in the sequence of (1)→(2)→(3)→(4) in FIG. 3A as the focusing ring 601 rotates in the forward direction, the states of the output of 603 and the output of 604 vary in the sequence of (H, L)→(H, H)→(L, H)→(L, L). This variation in state causes the up/down count to rise as shown in FIG. 3C. On the other hand, as the phasic state varies in the sequence of (1)→(2)→(3)→(4) when the focusing ring 601 rotates in the backward direction, the states of the output of 603 and the output of 604 vary in the sequence of (H, H)→(H, L)→(L, L)→(L, H), and the up/down count falls as shown in FIG. 3C.

The event counter function edge-detects the variations in the state of these two-phase pulsed, and performs hardware-wise operation to increase or decrease the up/down count by 1 by detecting, when one edge varies, the other H/L logic. By detecting edge variations regarding these two two-phase pulses, it is made possible to generate a count increment/decrement according to the direction of rotation with the accuracy of quad edge evaluation.

Figure 4:
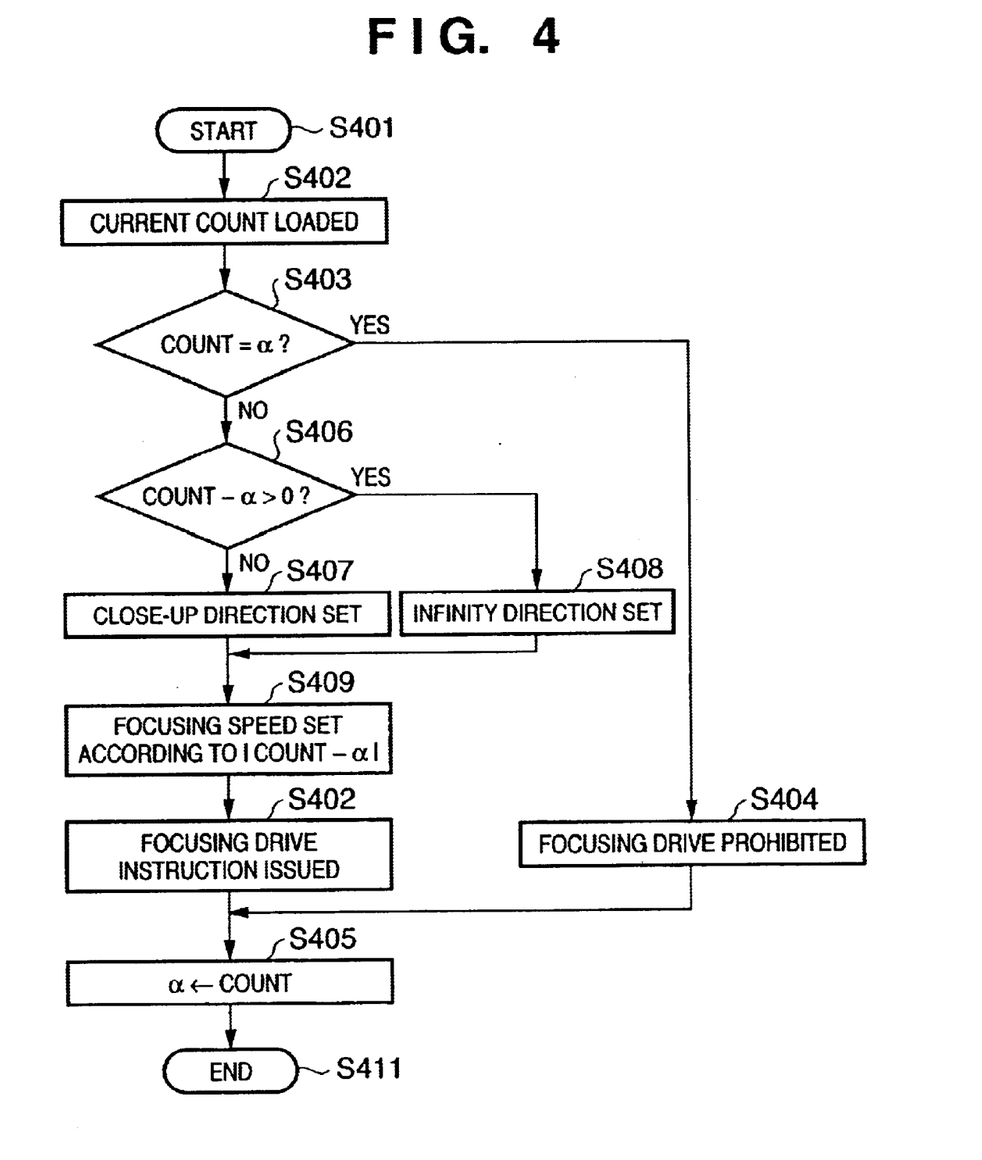
FIG. 4 is a flow chart of control to shift the focusing/compensating lens 105.

FIG. 4 is a flow chart of control to shift the focusing/compensating lens 105 according to the ring rotation detected by the method described with reference to FIGS. 3A, 3B and 3C. The processing charted in FIG. 4 is done in synchronism with the vertical sync signal for video signals.

Processing is started at step S401, and a count provided automatically by the event counter function is read in (step S402); at step S403, this count is compared with the previous count ($\alpha$) and, if the count is different, the focusing ring 601 is assumed to be rotating, and the control goes ahead to step S406. If no difference is found, the focusing ring 601 is assumed to be not rotating, focus driving is prohibited at step S404, and the current count is stored into a memory as $\alpha$ at step S405 to end the processing.

At step S5406, it is judged whether the count is increasing or decreasing from the previous count $\alpha$ and, if decreasing, the shifting direction of the focusing/compensating lens 105 is set towards the close-up (step S5407) or, if increasing, the shifting direction of the focusing/compensating lens 105 is set towards infinity (step S408). Then, the focusing speed is set according to the differential quantity (step S409), a focusing drive instruction is supplied to the motor driver 126 (step S5410), and the current count is stored into the memory as a at step S405 to go out of processing (step S411). Since a greater count differential means a correspondingly greater quantity of rotation of the focusing ring 601, the focusing speed is set high to increase the shifting quantity.

<Sequence of Power Supply to Ring Rotation Detecting Circuit 137>

Next will be described with reference to FIG. 5 the sequence of power supply to the ring rotation detecting circuit 137, which is another feature of the present invention. According to the invention, permission/prohibition of power supply is controlled according to the mode of use.

Processing is started at step S501, and the state of the mode switch 106 is determined at step S502. If it is in the viewing mode, power supply to the ring rotation detecting circuit 137 is prohibited at step S503 to make it impossible to manipulate the focusing ring 601.

In the shooting mode, the state of the zoom switch 130 is judged at step S504. If it is on for zooming, power supply to the ring rotation detecting circuit 137 is prohibited at step S503 or, if it is not, the state of the AF switch 131 is judged at step S505 and, if the AF switch 131 is off, power supply to the ring rotation detecting circuit 137 is permitted at step S506 to enable the focusing ring 601 to be manipulated.

Or if it is determined at step S505 that AF is on, it is judged at step S507 the camera is in a focusing-locked state, such as a state of half pressing of the photo key (the state of the photo switch 140 being half pressed). If the photo key is half pressed and focusing is locked, it will be considered that the photographer may manually operate focusing, and power supply to the ring rotation detecting circuit 137 will be permitted at step S506; or if these conditions are not met, power supply will be prohibited (step S503) and the processing is suspended (step S508), followed by a standby until the processing of FIG. 5 is done next time in synchronism with the next vertical sync signal.

By controlling power supply to the ring rotation detecting circuit 137 in this way according to the mode of use, power consumption in a shooting scene where the photographer performs no manual operation can be saved, and battery exhaustion can be reduced correspondingly. Thus, by providing the focusing ring 601 concentrically with the optical axis of the lenses and so controlling power supply to the ring rotation detecting circuit 137 as to permit or prohibit it according to the mode of use, it is made possible to perform manual operation whenever the conditions of the scene so requires and at the same time to save power consumption. In particular, while reducing battery exhaustion by controlling the focusing in a non-manual way during AF operation, it is made possible to realize pleasant operability enabling the photographer's intention to be accurately reflected in the picture that is taken, even in the AF mode, by allowing confirmation of exact focusing in a focusing-locked state wherein the photo key is half pressed after AF.

Figure 5:
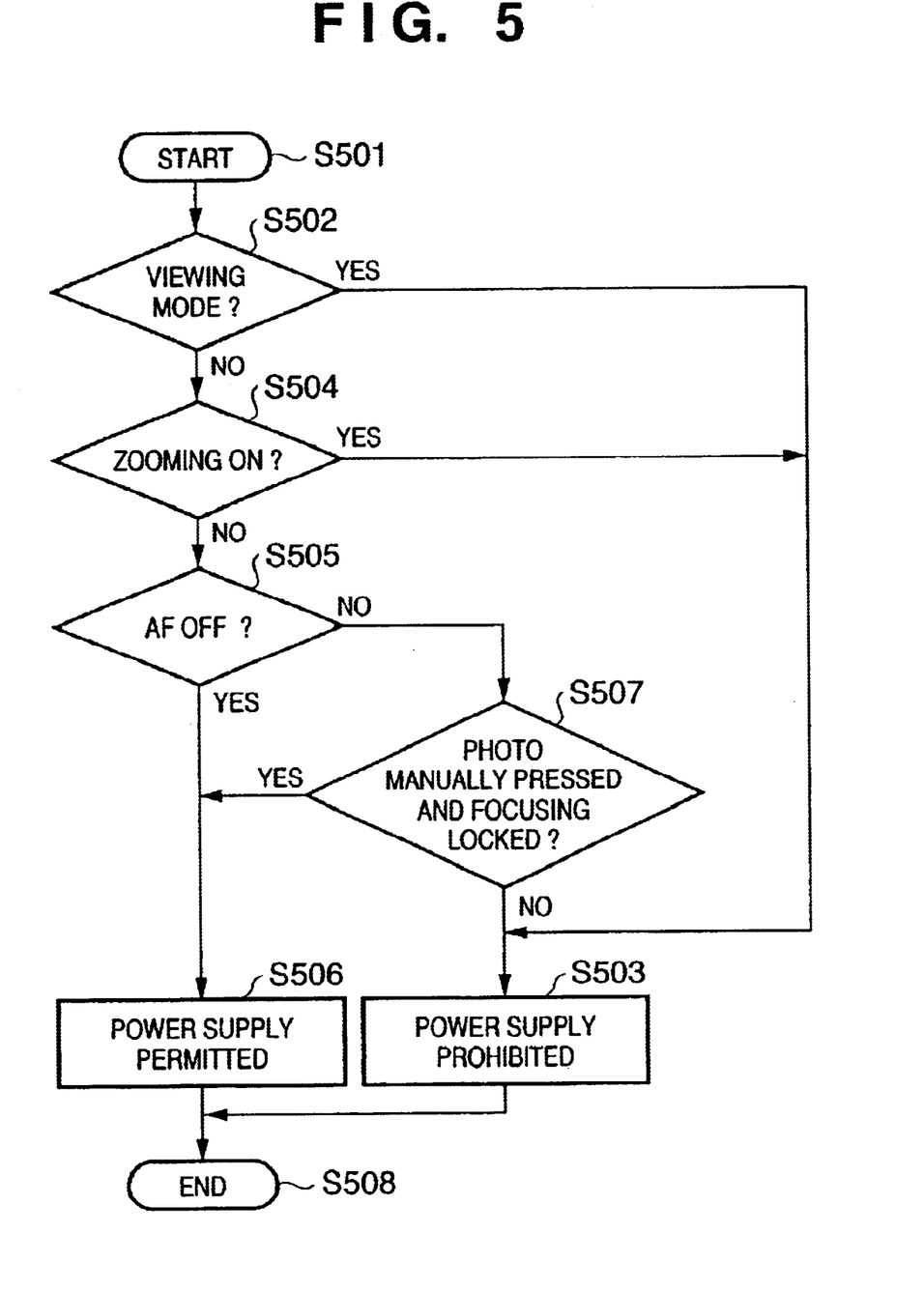
FIG. 5 is a flow chart showing the sequence of power supply to a ring rotation detecting circuit 137.

By storing the program according to the flow charts of FIG. 4 and FIG. 5 explained above into a memory device within the camera microcomputer 116 and operating it, the control method described above can be implemented.

Although the manual operation is supposed to involve mainly the focusing/compensating lens 105 in the foregoing description of this embodiment of the invention, it is not limited to this element, but the processing of step S502 and step S503 in FIG. 5 can also be applied to the zoom ring for manually operating the zoom lens 102, for instance, and the control of power supply to the zoom ring can be switched according to the mode of use.

This embodiment is supposed to have a configuration in which the camera and lenses are integrated, but the configuration may one of an interchangeable-lens type image pickup apparatus permitting interchanging of lenses and the camera body.

Further, though the description of this embodiment assumes the use of an optical sensor as the detection sensor for manual operation, an optical sensor is not the only choice, but a magnetic sensor can be used as well. If a magnetic sensor is desired, it will be possible to carry out similar detection of the rotation of the ring member by arranging magnets magnetized at a prescribed pitch on a circle in place of the comb-shaped structure 602 of the encoder shown in FIG. 8A, for instance, and two-phase magnetic resistance elements, such as MR sensors, in place of two pairs of photo-interrupter elements 603 and 604 whose phasic relationship is maintained, and generating a waveform as two-pulse signals by subjecting to signal processing by a comparator or the like substantially sine wave intensity signals and substantially cosine wave intensity signals, which are the output signals of the magnetic resistance elements.

The invention is not limited to the apparatus embodying it as described above, but can be effectively applied to both a system configured of a plurality of devices and to an apparatus consisting of a single device. It goes without saying that the invention can as well be completed by supplying the system or the apparatus with a recording medium in which are stored program codes of software to realize the functions of the embodiment described above and having the computer (the CPU or the MPU) of that system or the apparatus read out and execute the program codes stored in the recording medium.

In this case, the program codes themselves, which are read out of the recording medium, would realize the functions of the embodiment described above, and the recording medium storing the program codes would constitute the invention. Available recording media for supplying the program codes include, for instance, a Floppy (registered trademark) disk, hard disk, an optical disk, magneto-optical disk, CD-ROM, CD-R, magnetic tape, nonvolatile memory card and ROM. Needless to mention, the invention covers not only the realization of the functions of the embodiment described above by executing the program codes read out by the computer but also the realization of these functions by the performance by the OS or the like, operating on the computer, of part or the whole of actual processing.

It further goes without saying that the invention also involves the realization of the functions of the embodiment described above by causing, after the program codes read out of the recording medium are written onto an extension board inserted into the computer or a memory provided on an extension unit connected to the computer, the extensions processed by a CPU or the like provided on the extension board or the extension unit in accordance with an instruction of the next program codes to carry out part or the whole of actual processing.

As hitherto explained, the embodiment of the invention described above makes possible a saving in power consumption while enabling manual operation to be used in shooting any scene it is desired, and thereby helps realize pleasant photography.

The present invention is not limited to the above embodiments and various changes and modifications can be made within the spirit and scope of the present invention. Therefore, to apprise the public of the scope of the present invention the following claims are made.

What is claimed is:

1. An image pickup apparatus comprising:
    a detecting device adapted to detect the quantity of variation resulting from the shift of a ring member;
    a lens shifting control device adapted to shift/stop image pickup lenses in the direction of their optical axis on the basis of the result of detection by the detecting device; and
    a power supply control device adapted to change the state of power supply to said detecting device;
    wherein said power supply control device restrains power supply to said detecting device when said image pickup apparatus is in an automatic focusing driving, and permits power supply to said detecting device after said image pickup apparatus has been brought to an in-focus state by the automatic focusing driving.

2. The image pickup apparatus according to claim 1, wherein said power supply control device permits power supply to said detecting device in a focusing-locked state.

3. The image pickup apparatus according to claim 1 wherein said ring member is provided concentrically with the optical axis of said lenses.

4. A power supply control method for an image pickup apparatus having a detecting device adapted to detect the quantity of variation resulting from the shift of a ring member, and a lens shifting control device adapted to shift/stop image pickup lenses in the direction of their optical axis on the basis of the result of detection by said detecting device, the method having a control step of changing the state of power supply to said detecting device, wherein said control step restrains power supply to said detecting device when said image pickup apparatus is in an automatic focusing driving, and permits power supply to said detecting device after said image pickup apparatus has been brought to an in-focus state by the automatic focusing driving.

5. The power supply control method according to claim 4, wherein said control step permits power supply to said detecting device in a focusing-locked state.

6. The power supply control method according to claim 4 wherein said ring member of said image pickup apparatus is provided concentrically with the optical axis of said lenses.

7. A recording medium having stored thereon a control program for controlling power supply to an image pickup apparatus having a detecting device adapted to detect the quantity of variation resulting from the shift of a ring member, and a lens shifting control device adapted to shift/stop image pickup lenses in the direction of their optical axis on the basis of the result of detection by said detecting device, wherein:

said control program has codes of a control step of changing the state of power supply to said detecting device, wherein said control step restrains power supply to said detecting device when said image pickup apparatus is in an automatic focusing driving, and permits power supply to said detecting device after said image pickup apparatus has been brought to an in-focus state by the automatic focusing driving.

\* \* \* \* \*

UNITED STATES PATENT AND TRADEMARK OFFICE
CERTIFICATE OF CORRECTION

PATENT NO.   : 6,937,285 B2
DATED        : August 30, 2005
INVENTOR(S)  : Hiroto Ohkawara It is certified that error appears in the above-identified patent and that said Letters Patent is hereby corrected as shown below:

Column 6,
Line 33, delete "S5406" and insert -- S406 --.
Line 36, delete "S5407" and insert -- S407 --.
Line 41, delete "S5410" and insert -- S410 --.

Signed and Sealed this

Eighth Day of November, 2005

JON W. DUDAS
*Director of the United States Patent and Trademark Office*